United States Patent Office.

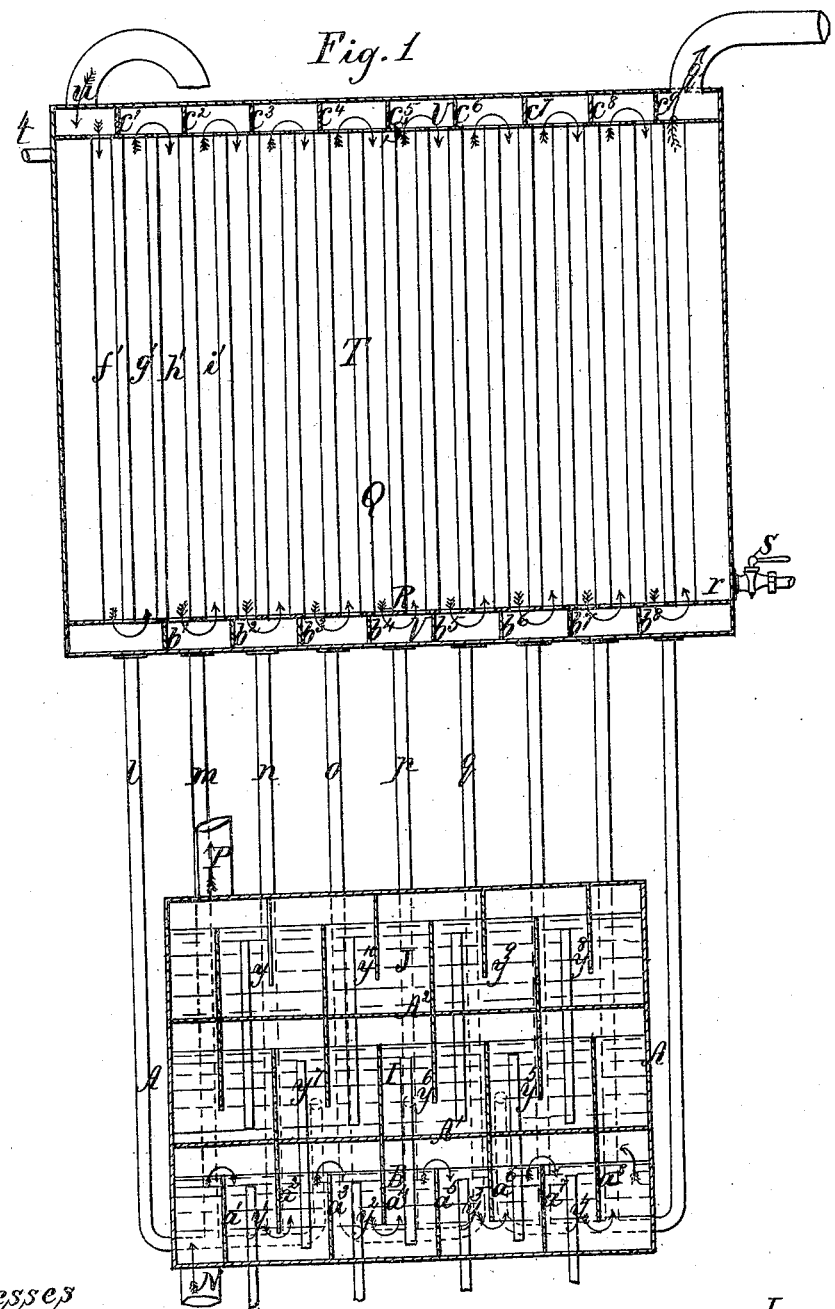

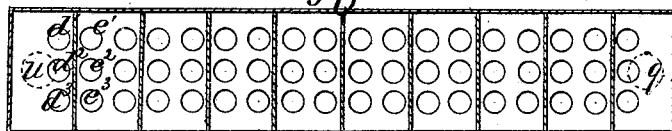
G. Kaiser.
Distilling App's.
No. 94,611. Patented Sep. 7, 1869.
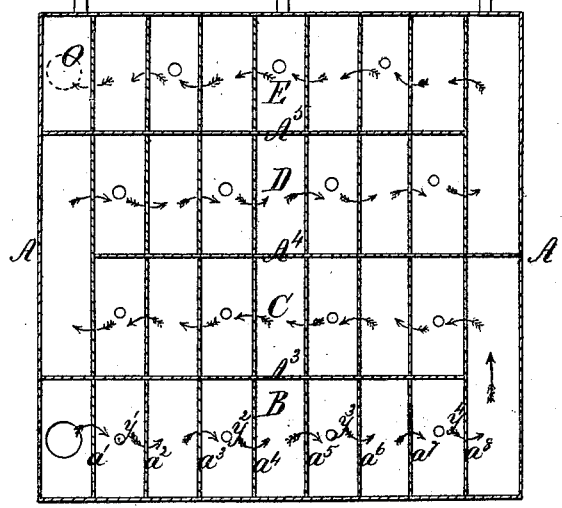
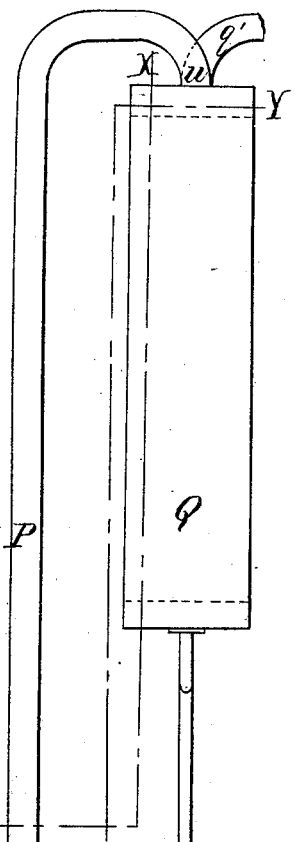
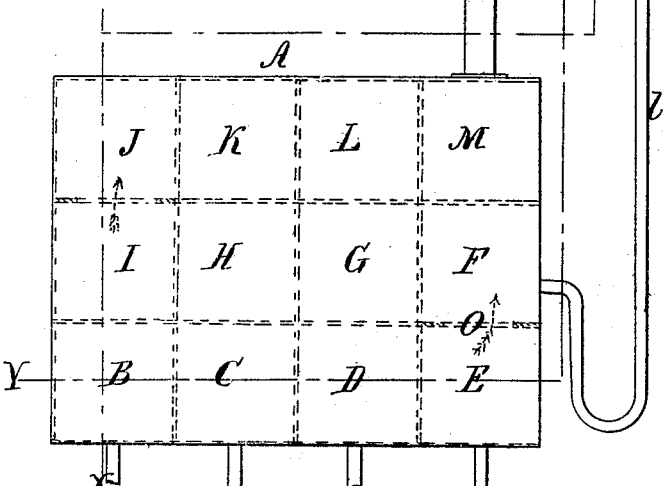
Witnesses
W. D. Waldron
Emil Vojnaok
Inventor
G. Kaiser

GOTTLOB KAISER, OF NEW YORK, N. Y.

Letters Patent No. 94,611, dated September 7, 1869.

IMPROVED APPARATUS FOR DISTILLING AND RECTIFYING SPIRITS.

The Schedule referred to in these Letters Patent and making part of the same.

*To all to whom it may concern:*

Be it known that I, GOTTLOB KAISER, of the city of New York, county and State of New York, have invented certain new and useful Improvements in the Construction of Columns and Dephlegmators for Rectifying, Redistilling, or Distilling-Apparatus, which I consider improvements on patent No. 78,596, granted to me June 2, 1868; and I do hereby declare that the following is a full, clear, and exact description of the same, reference being had to the accompanying drawing, in which—

Figure 1 is a vertical section on line X X, fig. 2.

Figure 2 is a side elevation.

Figure 3 is a horizontal section on line Y Y, fig. 2.

Figure 4 is an elevation of a part of my invention.

In the rectifying, redistilling, or distilling-apparatus now in general use, the column necessary for a large apparatus is a very bulky affair, sometimes from thirty to forty feet high, being at once very expensive, and demanding localities specially constructed.

The object of my invention is to arrange a column, or, more, an apparatus that replaces the same, in a very small space, reducing bulk and expense materially.

Further, in washing the spirit-vapors in a column, said was caused to be done, by its peculiar present construction, in certain pulsations, large bubbles rising at certain times through the washing-medium; in this case, most always low-wine. This prevents a thorough washing of the vapors, only the parts on the surface of the bubble being washed, and not the interior parts.

The object of my invention is to cause the vapors to be divided into a great number of minute fine streams, or into a very fine film, thereby bringing the vapors into intimate contact with the washing-medium, higher proof and finer spirits being the result.

The dephlegmator (goose) at present in use, of a single coil of the size of the vapor-pipe, or of several coils, the cross-section of which is equal to the vapor-pipe, is of great bulk, difficult and expensive to construct, and impossible to clean.

The object of my invention is to construct a dephlegmator of but a very small size, easily and cheaply constructed, and very ready of access to be cleaned.

The nature of my invention consists in arranging in a column the washing-compartments in series, side by side, and placing more or less of these series above each other, as the size of the apparatus may require.

Further, in perforating the separating-plates or partitions, in the different washing-compartments, at their lower ends, where they reach into the washing-medium, by a great number of minute holes, thereby insuring thorough washing of the vapors. This may be obtained by fine slots.

Further, in constructing my dephlegmator of straight tubes inserted into plates, similar to boiler-tubes, readily cleaned by taking off one single cover, easy of access. I make my tubes small, causing thereby also a minute division of the vapors, and insuring thereby a perfect separation of the phlegm or fusel-oil.

Further, in producing means for preventing vapors to pass over from one set of dephlegmating-tubes to the other, caused sometimes by the form of the low-wine return-tubes, by arranging the latter with liquid-columns, to prevent the passing over of vapor.

To enable others skilled in the art to make and use my invention, I will proceed to describe its construction and operation.

A, figs. 1, 2, and 3, represents my column, or, more, the apparatus replacing the column. It is a square box, closed on all sides, divided by horizontal partitions $A^1$ $A^2$ into three parts of equal size, one above the other.

A is further divided by the vertical partitions $A^3$ $A^4$ $A^5$, making in all twelve compartments, denoted in succession by the letters B C D E F G H I J K L M.

In each of these compartments rise up from the bottom plate cross-plates $a^1$ $a^3$ $a^5$ $a^7$, &c., to a certain distance of the top plate. Between each two of these come down cross-plates from the top plate, reaching to a certain distance from the bottom plate, marked on the drawing with $a^2$ $a^4$ $a^6$ $a^8$, &c.

The compartments B C D, &c., are filled with low-wine to a certain distance above the lower edge of cross-plates $a^2$ $a^4$ $a^6$, &c.; and small return-tubes $y^1$ $y^2$ $y^3$, &c., leading from the upper series of compartments to the lower ones, and from there to one of the stills, regulate the height of the low-wine in the cells.

Fig. 4 shows one of the cross-plates $a^2$ $a^4$ in elevation. It has near its lower edge a number of small perforations, $z$ $z$ $z$, through which the vapor has to pass, and whereby the same is divided into very fine streams.

Partition $A^3$ does not run clear through on the right, but stops at cross-partition $a^6$, thereby connecting compartment B with C on the left. Partition $A^4$ does not run through, thereby connecting compartment C with D, and in this manner each of the compartments composing a series is connected with the next, as clearly shown by the arrows in fig. 3.

Compartment E is connected by an opening, O, through partition $A^1$, with F of the series above; in similar manner, compartment I with J of the series above. By these means the horizontal series is connected.

It is now readily understood, that adding more washing-plates, and by increasing the number of compartments side by side, and the number of the series of these compartments above each other, the column may be increased to any-sized apparatus, leaving yet the column in a very compact form.

The operation of the column is now as follows:

The vapor enters through pipe N into compartment B, passes over the cross-plate $a^1$ through the liquid underneath the wash-plate $a^2$; or, more, through the perforations in the same, or partly through the perforations, and, in a very thin film, underneath the wash-plate $a^2$, which is left a certain distance of the bottom, if great rushes of vapors should come sometimes; then upward again through the liquid, over partition $a^3$, downward through the liquid, and through the perforations in wash-plate $a^4$, and again upward through the liquid, and so on, as shown by the arrows. Arriving at the end, the vapors are turned to partition C, and are washed in the same, as also in D E, in a similar manner. From E, it passes through hole O in partition $A^1$ to the series above, and so on.

The vapor passes from the column to the dephlegmator Q through pipe P.

The dephlegmator Q is, again, a square box, divided by two horizontal partitions, R and S, into three compartments T U V. The latter two are very shallow, and divided by a number of vertical partitions, $b^1\ b^2\ b^3\ b^4$ and $c^1\ c^2\ c^3\ c^4$. These partitions are placed alternately, one opposite the middle of the opposite two, as shown in fig. 1. Between each of these vertical partitions are two series of holes in the horizontal partitions R and S, $d^1\ d^2\ d^3$, $e^1\ e^2\ e^3$, more or less, according to the size of the apparatus. These holes are connected by thin tubes $f^1\ f^2\ f^3\ g^1\ h^1\ i^1$. The space around these tubes is filled with water of a desired temperature.

The vapors take, now, the following course, indicated on the drawing by arrows:

Entering at the top, at $u$, they pass down through pipes $f^1\ f^2\ f^3$, up through $g^1\ g^2\ g^3$, down again through $h^1\ h^2\ h^3$, up through $i^1\ i^2\ i^3$, and so on through the whole dephlegmator. At $g^1$, the vapors leave the latter and pass over to the condenser.

The phlegm or fusel-oil, and the low-wine condensed in the dephlegmator, pass off at the bottom to the column through return-pipes $l\ m\ n\ o\ p$, &c. Pipe $l$ runs a certain distance below the point where it connects to the column. Pipes $m$ and $o$ connect with $l$. A certain column of liquid, standing in this manner in each of the pipes, shuts off the vapors in the same from each other and from the column.

The warm water enters the compartment T, surrounding the tubes at $r$, is regulated here by cock $s$. It flows out at $t$.

I do not bind myself to any particular arrangement or construction of the washing-cells or compartments and series of compartments. They may be placed side by side, instead of running back and forth, and in series above each other, or they may be arranged in a circular or any other form; nor do I bind myself to any number of washings—there will be more or less, according to the size of distilling-apparatus; nor do I bind myself to any particular form, size, and number of tubes in the dephlegmator, nor to the size of the tubes, all depending on the quantity of spirits to be produced, and the space and location the apparatus is to have; nor do I bind myself to holes in the washing-plates $a^2\ a^4$, &c.; they may be slots or any other openings.

Having now fully described my invention,

What I claim as new therein, and desire to secure by Letters Patent, is as follows:

1. The washing-cells or compartments B C D, &c., arranged in series side by side, one series above another, in any desired number, substantially as and for the purpose herein specified.

2. The perforations $z$ in the wash-partitions $a^2\ a^4\ a^6$, &c., substantially in the manner and for the purpose herein set forth.

3. The construction of a dephlegmator of straight tubes, all as and for the purpose as herein set forth.

4. The peculiar construction and arrangement of back-fall tubes $l\ m\ n$, substantially as and for the purpose specified.

GOTTLOB KAISER.

Witnesses:
W. H. WALDRON,
EMIL VOSSNACK.